United States Patent [19]

Dodd

[11] Patent Number: 4,465,600
[45] Date of Patent: Aug. 14, 1984

[54] MEANS AND METHOD FOR RECOVERING ALGAE

[76] Inventor: Joseph C. Dodd, 6745 Alisal St., Pleasanton, Calif. 94566

[21] Appl. No.: 458,760

[22] Filed: Jan. 6, 1983

[51] Int. Cl.³ .............................................. B01D 37/02
[52] U.S. Cl. .................................... 210/777; 210/193; 210/784
[58] Field of Search ............... 210/386, 401, 193, 777, 210/780, 783, 784, 602; 47/1.7

[56] References Cited

U.S. PATENT DOCUMENTS

| | | | |
|---|---|---|---|
| 3,836,681 | 9/1974 | Dodd | 210/783 |
| 3,951,805 | 4/1976 | Dodd | 210/386 |
| 4,255,261 | 3/1981 | Dodd | 210/386 |

FOREIGN PATENT DOCUMENTS 0012292  4/1980  Japan ................................. 210/386

OTHER PUBLICATIONS

Prescott, G. W., *The Algae: A Review*, pp. 148 and 289.

Primary Examiner—Peter A. Hruskoci
Assistant Examiner—Sharon T. Cohen
Attorney, Agent, or Firm—Lothrop & West

[57] ABSTRACT

To separate a small alga such as Dunaliella from a containing liquid, a filter substrate is provided with a surface coat including a large alga such as Spirulina. The Dunaliella and some liquid are run through the Spirulina and the substrate and so are separated with some Spirulina content.

6 Claims, 1 Drawing Figure

U.S. Patent      Aug. 14, 1984      4,465,600
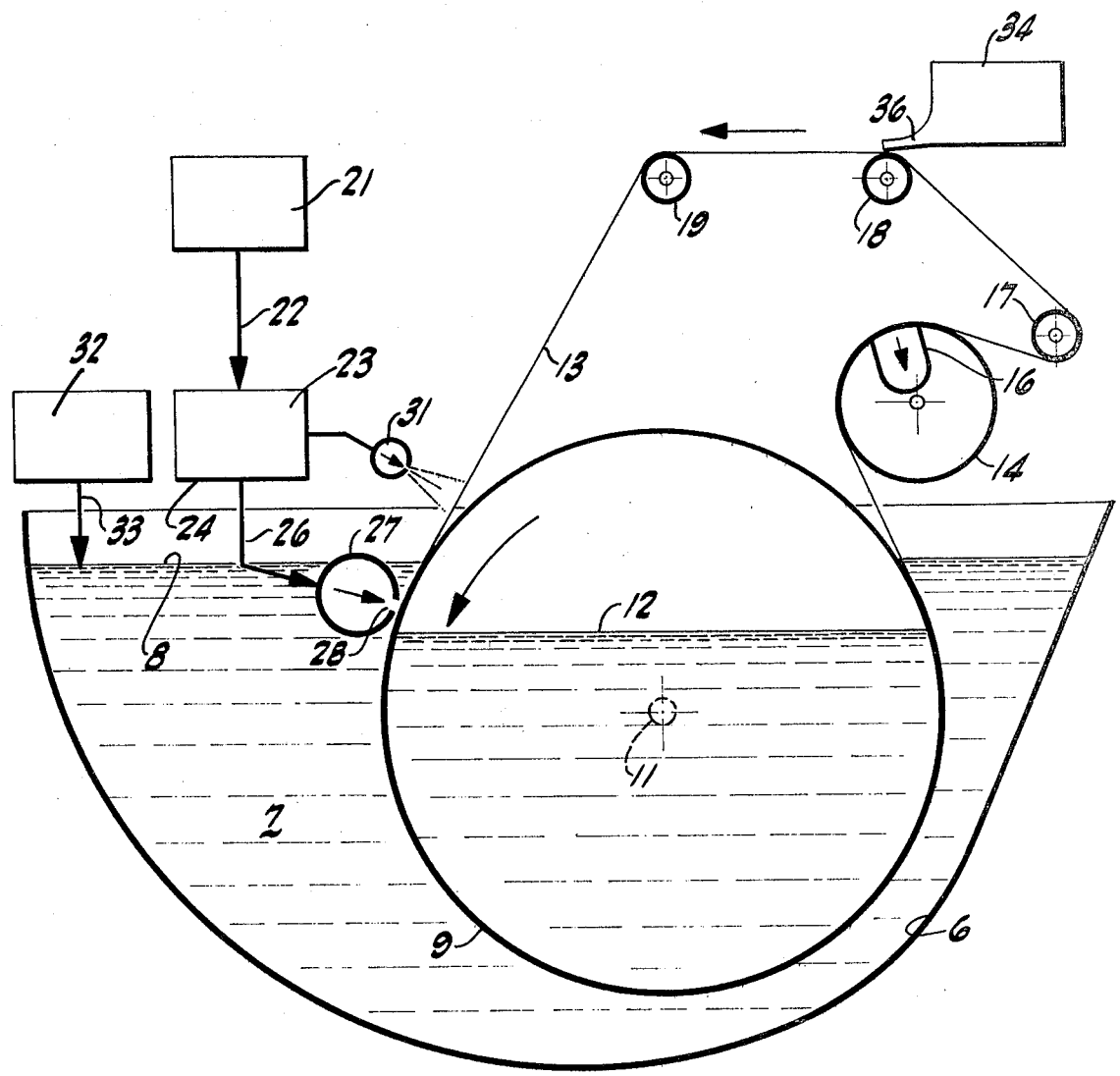

MEANS AND METHOD FOR RECOVERING ALGAE

BRIEF SUMMARY OF THE INVENTION

To separate small algae, such as Dunaliella, from a containing liquid, a filter drum is provided with a surface coat including a layer of large algae such as Spirulina. The Dunaliella are deposited on the surface coat and are largely separated from the containing liquid, with some Spirulina as an accompaniment. The method involves using relatively large algae, such as Spirulina, in a layer as a filter for relatively small algae, such as Dunaliella.

PRIOR ART

Reference is made to the applicant's issued U.S. Pat. Nos. 3,836,681, 3,951,805 and 4,255,261 which have to do with algae filtration, but are not concerned with recovery of an alga such as Dunaliella. This particular alga is difficult to recover from its environmental liquid since it is relatively small in size and has flexible, rather smooth walls. It is, however, a desirable alga and can be utilized commercially even though it is admixed with some proportion of another alga such as Spirulina. Spirulina is filamentous and, as its name indicates, of a spiral or helical configuration. It is considerably larger than Dunaliella and is compatible therewith as a food product.

BRIEF DESCRIPTION OF THE DRAWING

The drawing is a diagrammatic showing of one form of an apparatus useful in carrying out the process of the invention and in ultimately recovering Dunaliella.

DETAILED DESCRIPTION

While the basis of the present disclosure is a filtration step, it is important that a particular kind of filtration be provided. Some sorts of filter media such as asbestos fibers, while fine enough to filter Dunaliella cells, are not suitable for use or admixture with algae for good purposes and do not have some of the other properties that are desirable. Consequently, there is provided herein an arrangement for employing a manner of filtration effective to provide an ultimate, substantial separation of Dunaliella from accompanying liquid and with some Spirulina intermixed therewith. The apparatus is primarily a container 6 or vat adapted to receive a liquid medium 7, usually a brine, having a surface 8. A rotary drum 9 is carried by an axial shaft 11 and is partly submerged. There is a liquid level 12 within the drum lower than the surface 8 since the interior of the drum is drained through a hub outlet at one or both ends of the drum at the shaft 11.

Trained around a portion of the drum 9 is a filter belt 13 preferably of a fabric having a relatively fine mesh and of a continuous nature. The fabric not only extends largely around the drum 9, but also partially curves around a recovery drum 14 disposed above the liquid level 8 and designed to rotate parallel to the drum 9. The drum 14 has therein a receiving chamber 16 subjected to a vacuum. From the periphery of the recovery drum 14, the belt 13 travels around an idler roller 17 and a subsequent idler roller 18 to a final idler roller 19 to return to its contact with the drum 9. The various rollers and drum are appropriately rotated at selected speeds.

Pursuant to the invention the filter belt or web 13 is provided with an initial layer of filtering material. Preferably this is an alga such as Spirulina which comes in a liquid medium from a source 21. The Spirulina is readily conducted through a duct 22 and forms a concentrated body 23 in a container 24. The concentrated Spirulina in the container 24 is substantially the same as in the culture source 21 except that the liquid volume is considerably less. Due to the usual difference in growth media characteristics for Spirulina and Dunaliella cultures, it is preferable that the Spirulina cells be separately harvested so that the growth media can be recycled to the separate cultures. From the container 24 there are alternate ways of providing the Spirulina to the filter belt. One is to conduct the liquidborne Spirulina through a lead 26 to a distributor pipe 27 having an opening 28 in substantial abutment with the surface of the belt 13. The Spirulina and accompanying liquid simply flow onto the belt, at a location about where the belt submerges below the level 8, for further progression through the vat 6.

While this system is feasible, it is separately or additionally preferred to utilize another way of applying the Spirulina and the accompanying liquid to the belt. That is accomplished by providing a number of flat spray nozzles 31, conveniently in the atmosphere at a location just about where the belt submerges below the level 8. The nozzles are aligned side by side axially of the drum 9, so that a generally fan-shaped spray, in plan, from each spray nozzle provides coverage of the adjacent or slightly overlapping sections axially of the drum. The spray pattern is conveniently quite flat and so affords a generally uniform, linear coating of Spirulina onto the filter belt prior to or at the point where the filter belt leaves the air and submerges beneath the surface 8.

With its coating of Spirulina and accompanying liquid, the belt 13 advances onto and with the drum 9. The accompanying liquid tends to be pulled through the belt to the interior thereof, although some accompanying liquid joins the liquid medium 7. The liquid medium 7 containing Dunaliella cells in suspension moves through the belt 13 under the differential head between liquid surfaces 8 and 12, and the Dunaliella deposits on and the liquid is filtered through the already-present precoat of Spirulina on the belt 13. The Dunaliella suspension is provided from a feed source 32, in a known way, through a feed pipe 33 into the vat 6.

As the belt 13 emerges from the vat 6 above the surface 8 and is entrained around the recovery drum 14, and especially as it passes over the receiving chamber 16, the then-adjacent Dunaliella with the necessarily accompanying Spirulina are drawn off together with some of the entrained liquid medium to the receiving chamber 16, from which they flow or are transported to an appropriate discharge. The belt, after leaving the receiving chamber 16 and being more or less devoid of both algae, Spirulina and Dunaliella, then travels back toward its point of beginning for recycling.

As an alternate or an addition, the belt just after rounding the roller 18 can be provided with a precoat of Spirulina from a source 34. This feeds through a duct 36 onto the belt surface. While the set of sprays 31 is preferred, it is sometimes helpful to utilize a precoat in air from a source such as the duct 36 leading from the tank 34.

This apparatus works appropriately to utilize a relatively large, filamentous, preferably spirally or helically configured alga as a filter aid or medium or as part of a way of separating a much smaller, generally flexible alga, such as Dunaliella, from its carrier liquid. The product is somewhat an admixture of both Dunaliella and Spirulina, but since the two algae are generally suitable for the same purposes, the fact of admixture is not detrimental.

The method involved includes providing on a suitable filtering substrate a first coating of a relatively large alga having a good filtering configuration, such as Spirulina. This is preferably in a somewhat concentrated form. Then a medium containing another small alga, such as Dunaliella, is passed through. The liquid can readily pass through the Spirulina and the filter substrate, but the Dunaliella is in effect trapped with the Spirulina. The recovery is then of both the Dunaliella and Spirulina somewhat admixed, in a substantially concentrated form compared to the pond culture medium. Spirulina may also be added as a body feed to the Dunaliella suspension to enhance or extend the filtration of Dunaliella. In this case, the suspensions of Spirulina and Dunaliella may be mixed either before or after entering the vat and with or without a Spirulina precoat.

I claim:

1. A machine for recovering small algae comprising a vat adapted to hold a first liquid having a surface level and containing said small algae, a filter drum mounted in said vat partially below said surface and adapted to rotate in a predetermined direction, a recovery drum rotatably mounted near said vat and above said surface, a filter belt, means for training said filter belt to descend into contact with said filter drum and to extend partly around said filter drum to contact one side of said filter belt with said filter drum, said contact starting at a location substantially at said surface level, and said filter belt being trained partly around said recovery drum to contact the other side of said filter belt with said recovery drum, a separate source of large algae in a second liquid distinct from said first liquid, said large algae being capable of forming a filter aid deposit for filtering said small algae from said first liquid, a means for introducing large algae from said separate source into a container, distributor means adjacent to and open to the descending surface of said filter belt for flowing said second liquid together with said large algae out of said container and onto the side of said filter belt away from said filter drum and adjacent to said location, means for subjecting said filter drum to a pressure difference and inducing flow of said first liquid and said second liquid in one direction through said filter belt while lodging said large algae in a deposit on said one side of said filter belt, and means for flowing said first liquid and said small algae in said direction through said deposit lodged on said filter belt and through said filter belt itself.

2. A machine as in claim 1 in which said separate source of large algae is above said surface, said distributor is above said surface in the air, and a duct connects said separate source and said distributor.

3. A machine as in claim 2 in which said distributor is a spray nozzle in the air and is adjacent to and directed toward the surface of said filter belt.

4. A machine as in claim 1 in which said separate source of large algae is above said surface.

5. A method of recovering non-filamentous small algae from a liquid containing such small algae comprising providing a liquid-pervious filtering surface subject to a pressure difference by having on one side a relatively high pressure and having on the other side a relatively low pressure, forming a filter aid deposit on the one side of said filtering surface with filamentous large algae said large algae being capable of forming a filter aid deposit for filtering said small algae from said liquid and subjecting said filtering surface to said pressure difference and filtering said small algae from said liquid by flowing said liquid through said deposit.

6. A method of recovering Dunaliella from a liquid containing such algae comprising providing a liquid-pervious filtering surface subject to a pressure difference by having on one side a relatively high pressure and having on the other side a relatively low pressure, forming a filter aid deposit on the one side of said filtering surface of a number of Spirulina capable of filtering said Dunaliella from said liquid, subjecting said filtering surface to said pressure difference and filtering said Dunaliella from said liquid by flowing said liquid through said deposit.

* * * * *